Oct. 22, 1968      P. P. GRAD      3,407,321

STRUCTURE FOR SECURING MOTOR WINDING HEADS

Filed Oct. 4, 1965

INVENTOR.
PETER P. GRAD
BY
Brumbaugh, Free, Graves & Donohue
his ATTORNEYS

United States Patent Office 3,407,321
Patented Oct. 22, 1968

3,407,321
STRUCTURE FOR SECURING MOTOR WINDING HEADS
Peter P. Grad, Woodstock, N.Y., assignor to Rotron Manufacturing Company, Inc., Woodstock, N.Y., a corporation of New York
Filed Oct. 4, 1965, Ser. No. 492,607
6 Claims. (Cl. 310—270)

ABSTRACT OF THE DISCLOSURE

A means for securing the windings in a dynamoelectric machine to a winding frame, in which an end cap, having a radial flange at one end of a body portion and at least one resilient arm extending from the other end of the body portion, is placed against the end of the frame to be wound. During winding, the resilient arm is held away from the frame so that the end turns of the winding overlie the flange to secure the end cap structure to the frame. When winding is complete, the resilient arm is released, whereby it returns toward its normal position to engage the end turns of the winding and keep them in place.

This invention relates to devices and techniques for the winding of electric motors, and more particularly to a clamping means for securing the end turns of motor windings to their supporting elements.

The stators and/or rotors of conventional motors comprise a stack of laminations (or in some cases solid cores) having slots formed therein into which coil windings of the motors are inserted, either manually or by machine. The end turns of the coil windings (portions of the wire crossing from slot to slot) form the winding head of the motor and usually contain two or more groupings or bundles of conductors. After the windings have been formed on the stator or rotor, the winding heads must be secured so that the individual turns of the winding head do not deform or interfere with subsequent processing and handling, and so that the winding head will not come into contact with the moving part of the motor after assembly.

Heretofore, this has been accomplished by tying, taping, or sewing the individual wire bundles of the winding head. Often, taping of the bundles is precluded once the rotor or stator has been wound, and hand tying becomes the only alternative. Tying, however, is not only an expensive, time-consuming operation, but may jeopardize the quality of the finished motor winding, since the steel needles employed in the tying of the windings can easily damage the thin insulation of the wire conductors.

One object of the invention, therefore, is to provide a novel device and method for securing the winding heads of motor parts which avoids the disadvantages of presently known expedients.

A further object of the invention is to provide winding head securing means which facilitates economic and quality winding of motor parts.

Another object of the invention is to provide improved methods for winding motor parts which are simpler, faster and produce better finished products than presently known techniques.

These and other objects of the invention are achieved with the aid of insulating end caps which include flanged body portions adapted to be mounted at the respective ends of the motor part being wound and a plurality of resilient means or fingers extending outwardly from the body portions and shaped to clamp the wire bundles of winding heads against ends of the motor part. During winding, the resilient fingers, any suitable number of which may be used, are held away from the slot ends so as not to interfere with the insertion of the windings.

When the winding has been completed, the resilient fingers are released and they spring back to their initial positions, thereby clamping the end turns of the windings and holding them against the flange and in position relative to the motor part. Thereafter, heat and pressure may be applied to the end cap to further compact and form the winding head.

For a better understanding of the invention, reference may be made to the following detailed description, taken in conjunction with the accompanying drawings, in which.

Figure 1:
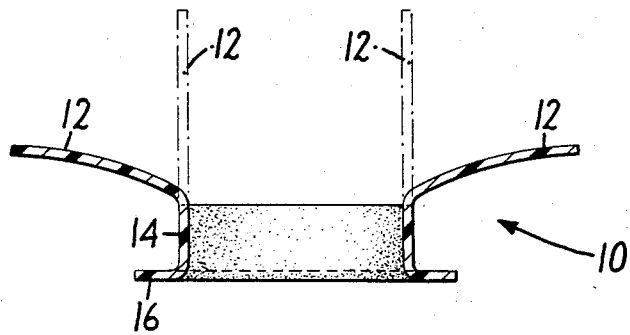
FIGURE 1 is a cross section of an end cap according to the invention.

Referring to FIGURE 1, illustrating a preferred embodiment of the invention, the end cap 10 comprises a body portion and two outwardly extending resilient members, or fingers 12. The body portion includes a cylindrical collar 14 and a flange 16 extending radially around the collar at one end thereof. The collar 14 may, of course, be formed in any geometrical configuration, such as a square, and may be shaped to meet the particular geometries of the motor part with which it is to be used. The cap can be made from a number of materials, including polyolefins and nylon. These materials, because of their substantial plastic memory characteristic, permit prolonged deflection or deformation of the projecting fingers 12 without permanent distortion. Thus, the fingers 12 can be deflected outwardly, as illustrated by the phantom lines, and be held in that position during the winding of a motor part, and will return to their normal, or pre-stressed, positions upon being released after winding.

Figure 2:
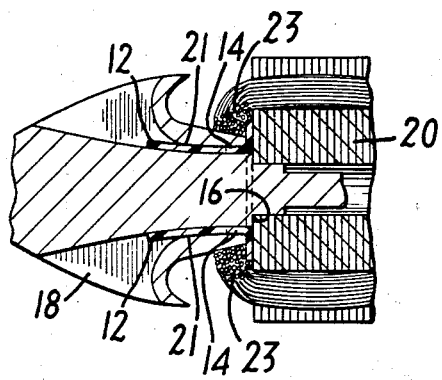
FIGURE 2 is a cross section view showing the end cap of FIGURE 1 in position for winding, relative to a motor stator and a winding mandrel.

FIGURE 2 shows the cap of FIGURE 1 positioned in the winding mandrel 18 used in a conventional automatic winding machine. Such mandrels, which are inserted at each end of the motor part and mounted on a common support bar extending therethrough, are generally arrowhead-shaped with smooth, conical points to allow the wire to slide readily over them. The motor part with attached mandrels, is firmly held in a cylindrical hollow formed in the opposing faces of a pair of support blocks. The entire assembly is then rotated about an axis perpendicular to the line joining the mandrel points (i.e., vertical as seen in FIGURE 2) as it draws wire from a spool, the mandrels guiding the wire into the slots.

The flange 16 of the end cap is held in coaxial abutment with the end of the motor part, e.g., lamination stack 20, by the mandrel 18 and the fingers 12 of the end cap fit into suitable grooves 21 provided in the mandrel. The latter holds fingers 12 in an outwardly deflected position away from the ends of the slots and guides the wire from the spool on the winding machine into the slots. It will be understood that a similar mandrel 18 and end cap is provided at the other end of the stack 20. After winding, the mandrels 18 are removed and the resilient fingers 12 snap back to their normal positions, thus clamping the end turns 23 of the winding conductors against the respective ends of the stack 20. The end turns themselves hold the end caps firmly to the stack. The curvature of the fingers 12 aids in preventing the individual conductors in the wire bundle from straying toward the outer periphery of the stator, where they may be damaged.

Figure 3:
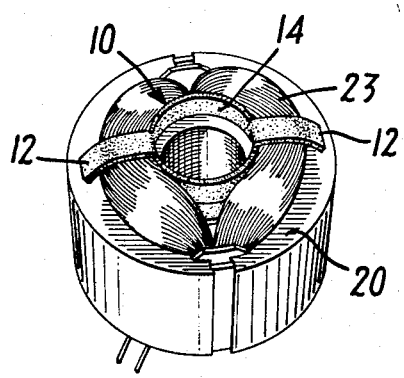
FIGURE 3 is a perspective view of a motor stator assembly utilizing the end cap of FIGURE 1.

FIGURE 3 shows a motor stator which has been wound in the manner described in connection with FIGURE 2. The action of the resilient fingers 12 on the end turns 23 can be clearly observed. Where there are many conductors in the winding, the motor head winding bundles may become relatively stiff and difficult to maintain in position. In this case, the cap 10 can be provided with additional fingers to increase the total resilient pressure applied to hold the motor head windings in position.

Although a motor structure, prepared in accordance with the foregoing such as illustrated in FIGURE 3, is adequate for many applications, it may be desired to further protect the conductors of the motor windings. Specifically, it is often desirable to bond the insulative end cap to the end turn conductors to ensure the ruggedness of the motor and also to render the motor conductors impervious to corrosive environments. In accordance with the invention, this can be accomplished by coating the insulative end cap with a thermosetting material such as polyurethane, and winding the motor with a coated magnet wire that has been overcoated with a bondable coating. Polyurethane has been found suitable for the over-coating of nylon coated magnet wire, as well. After the winding operation has been completed and the motor winding head has been secured by the coated resilient fingers (see FIG. 3), it is further formed under slight pressure and the application of heat. Processing the winding head in this manner causes the magnet wire and the fingers 12 to bond together and to form a homogeneous winding head structure. Temperatures on the order of 300° F. have been found sufficient to produce a satisfactory homogeneous bonded insulation about the winding head conductors.

A still simpler method of further forming the motor winding head can be realized by molding the insulative end cap from a copolymer and coating it with a pressure sensitive adhesive such as "Hycar." As in the previous example, the motor is wound with a magnet wire which has been over-coated with a bondable polyurethane coating. This wire is commercially available under trade names such as Bondeze. Upon completing the winding operation, the resilient members of the insulated end cap are pressed to the end turns under light pressure, causing the conductors of winding head to adhere to the resilient members. If desired, the winding head can be further treated with varnish or potting compound, depending on the environment in which the motor is to operate.

The invention thus eliminates the need for tying, taping, or other operations involving expensive hand working of the winding head and provides a rugged coil structure at reduced cost. The end caps themselves are readily formed of inexpensive materials and no changes in the motor structure are required, since the end turns themselves hold the end caps against the stack.

Although the mandrel 18 shown in FIGURE 2 is of the type employed in a conventional automatic winding device, it will be realized that any means suitable to the winding procedure employed may be used to maintain the fingers 12 extended axially of the stack. A simple cylindrical rod with an outer ring to hold the fingers down against its outer surface, for example, may be satisfactory. The collar 14 and/or the flange 16 of the end cap may be provided with indexing ears or cutouts to simplify registry of the fingers 12 with the midpoints of the respective end turn bundles 23. It will be understood, of course, that any number of fingers 12 may be provided on the end cap, depending upon the number and thickness of the end turn bundles. The device and technique disclosed here are not limited to use in motor winding, but are applicable as well to various other types of coil winding.

The embodiments of the invention described above are illustrative only, and many modifications and variations may be made therein within the skill of the art without departing from the spirit and scope of the invention. All such modifications and variations, therefore, are intended to be included within the scope of the appended claims.

I claim:
1. In a dynamoelectric machine including a frame having windings thereon, means for securing windings to a winding frame comprising, a body portion adapted to be held against said frame, and resilient finger means normally extending from said body portion in a direction to firmly retain said windings on said frame, said finger means being temporarily deformable away from said direction to allow said windings to be mounted on said frame, and returnable by virtue of its resilience to its normal position upon release of the deforming forces.

2. In a dynamoelectric machine including a frame having windings thereon, means for securing windings to a winding frame comprising, a cylindrical body portion having a radially extending flange at one end thereof adapted to be held against said frame by said windings, and at least one resilient finger normally extending from the other end of said body portion in a direction to firmly retain said windings against said flange and said frame, said finger being temporarily deformable to a position generally parallel to the axis of said cylindrical body portion to allow said windings to be mounted on said frame, and returnable by virtue of its resilience to its normal position upon release of the deforming forces.

3. Securing means according to claim 2 above formed of a plastic having a substantial plastic memory characteristic.

4. In a dynamoelectric machine including a frame having windings thereon, means retaining the end turns of electric motor coil windings firmly in place on the motor part on which the windings are carried comprising, a generally cylindrical body portion having a radially extending flange at one end thereof adapted to be held against said motor part by said end turns, and a plurality of resilient fingers formed integrally with said body portion and normally extending from the other end thereof in a direction to firmly retain said end turns against said flange and said motor part, said fingers being temporarily deformable to positions generally parallel to the axis of said cylindrical body portion to allow said coil windings to be applied to said motor part, and returnable by virtue of their resilience to their normal positions upon release of the deforming forces, said body portion and said fingers being formed of a plastic having a substantial plastic memory characteristic.

5. End turn retaining means according to claim 4 wherein said body portion and said fingers are coated with a thermosetting material.

6. End turn retaining means according to claim 4 wherein said body portion and said fingers are coated with a pressure-sensitive adhesive.

References Cited
UNITED STATES PATENTS

| | | | |
|---|---|---|---|
| 1,769,063 | 7/1930 | Kimman | 310—270 |
| 2,820,914 | 1/1958 | Rudoff | 310—43 |
| 2,970,237 | 1/1961 | Kent | 310—260 |
| 2,999,176 | 9/1961 | Lindström | 310—215 |
| 3,149,297 | 9/1964 | Rechel | 336—209 |

MILTON O. HIRSHFIELD, *Primary Examiner.*

R. W. TEMPLETON, *Assistant Examiner.*